(12) United States Patent
Hsu et al.

(10) Patent No.: US 6,295,058 B1
(45) Date of Patent: *Sep. 25, 2001

(54) METHOD AND APPARATUS FOR CREATING MULTIMEDIA ELECTRONIC MAIL MESSAGES OR GREETING CARDS ON AN INTERACTIVE RECEIVER

(75) Inventors: P. Robert Hsu, San Jose; Yunie Sonoda, Los Altos; Jesse Ellenbogen, Mountain View, all of CA (US)

(73) Assignees: Sony Corporation, Tokyo (JP); Sony Electronics Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/119,599

(22) Filed: Jul. 22, 1998

(51) Int. Cl.$^7$ .................................. G06F 3/14; H04N 7/14
(52) U.S. Cl. ................... 345/339; 345/327; 345/329; 345/302; 707/515; 707/908; 348/13
(58) Field of Search ................... 345/339, 327, 345/329, 302, 328, 333, 334, 331, 332, 435, 330; 707/514–517, 520, 908, 104; 709/201, 205, 219, 203, 204; 348/10, 12–13, 563, 569, 552

(56) References Cited

U.S. PATENT DOCUMENTS

| | | |
|---|---|---|
| 5,396,340 | 3/1995 | Ishii et al. ............... 386/106 |
| 5,412,773 | 5/1995 | Carlucci et al. ............ 345/327 |
| 5,416,900 * | 5/1995 | Blanchard et al. ........ 707/520 X |
| 5,469,209 | 11/1995 | Gunday et al. ............ 348/96 |
| 5,479,518 | 12/1995 | Zampini .................. 381/119 |
| 5,508,940 | 4/1996 | Rossmere et al. .......... 345/328 |
| 5,513,010 | 4/1996 | Kori et al. ............... 386/104 |
| 5,535,137 | 7/1996 | Rossmere et al. ......... 345/435 X |
| 5,548,327 | 8/1996 | Gunday et al. ............ 348/97 |
| 5,613,057 * | 3/1997 | Caravel .................. 345/302 |
| 5,675,752 * | 10/1997 | Scott et al. .............. 345/333 |
| 5,751,590 * | 5/1998 | Cannon et al. ............ 700/233 |
| 5,781,186 * | 7/1998 | Jennings ................. 345/302 |
| 5,850,218 * | 12/1998 | LaJoie et al. ............ 345/327 |
| 5,895,477 * | 4/1999 | Orr et al. ................ 707/517 |
| 5,956,737 * | 9/1999 | King et al. .............. 707/517 |
| 6,081,262 * | 6/2000 | Gill et al. ............... 345/302 |
| 6,154,600 * | 11/2000 | Newman et al. ........... 348/552 X |

\* cited by examiner

Primary Examiner—Raymond J. Bayerl
(74) Attorney, Agent, or Firm—Finnegan, Henderson, Farabow, Garrett & Dunner, L.L.P.

(57) ABSTRACT

A user composes a multimedia greeting card or multimedia email message by selecting a design template, which has previously been created and stored on the system. The design template contains one or more slots, into which the user may simply drag and drop any desired text, video, or audio data. The user may also edit and add enhancements to the multimedia greeting card or email message. If desired, the user may electronically mail the resulting product to another user.

22 Claims, 10 Drawing Sheets

METHOD AND APPARATUS FOR CREATING MULTIMEDIA ELECTRONIC MAIL MESSAGES OR GREETING CARDS ON AN INTERACTIVE RECEIVER

BACKGROUND OF THE INVENTION

A. Field of the Invention

This invention generally relates to electronic mail systems and, more particularly, to methods and apparatus for creating multimedia electronic mail messages or greeting cards on an interactive receiver.

B. Description of the Related Art

The past several years have seen a dramatic shift in methods of communicating information. In the past, the only way of communicating information was via standard mail delivery of handwritten or typed documents. With the advent of the telephone and telegraph, it became possible to convey voice signals and information electrically. Recently, electronic communication has become a rapidly increasing way of conveying information—especially because of widely available access to the Internet. People now exchange electronic mail ("email") addresses concurrently with telephone numbers, and many major businesses provide access to information and services on the Internet via sites on the World Wide Web.

Because of the rapid pace of development in this field, however, the evolution has not been completely seamless. Although it is now possible to communicate audio/visual information electronically, it is certainly not easy to do so. Simply to send and receive email, a user initially must purchase a computer system, configure all of its component parts to interoperate, learn the operating system for the computer, contract with an Internet service provider, and learn how to use the application software for email. If a user wants to send audio-visual information such as a picture, video sequence or audio, the user is forced to purchase even more hardware and learn even more software.

A conventional computer system is shown in FIG. 1. A computer system 100 is used to compose and transmit email, generally by dial-up telephone connection, to an Internet service provider (ISP) 180. ISP 180 contains a mail server 190, which is responsible for receiving email and routing it to the appropriate destination address.

Computer system 100 consists of a computer 130, to which are attached several accessories. Computer 130 may be any conventional home or business computer such as a personal computer (PC), a Macintosh, a network computer, or a Sun Workstation. The user interface to computer 130 includes a keyboard 140, some type of pointing device such as a mouse 150, and a display screen 120. In addition to a user interface, computer system 100 may also contain an offline storage device 110 for storing messages to be sent and messages that have been received. Typical offline storage devices include a hard disk drive, a floppy disk drive, or a tape unit. A typical computer system 100 also contains a modem 160 which is employed to send or receive messages between computer system 100 and ISP 180.

To send a email message, a user enters a message into computer 130 via keyboard 140 and/or mouse 150. This email message may or may not then be stored on offline storage device 110. The email message is then transmitted from computer 130 to ISP 180 via modem 160. Upon receiving the message, mail server 190, within ISP 180, forwards the message to the appropriate destination. In this manner, a user of computer system 100 may transmit a email message to any user that is connected to ISP 180, either directly or indirectly via the Internet.

A user desiring to transmit an email message containing audio-visual information must further employ an audio-video input interface 170. To this interface 170 a user may attach an audio-visual source such as, for example, a video cassette recorder (VCR) or a camcorder. To transmit an audio-visual email message, audio-visual information is transferred from the audio-visual source to computer 130 via interface 170, and converted to an appropriate format such as MPEG. This information may or may not be stored offline on storage device 110. The information is then composed into an email message and is transmitted from computer 130 to ISP 180 via modem 160. Mail server 190 of ISP 180 forwards it to the appropriate destination.

As the preceding explanation demonstrates, composing and transmitting an email message on a conventional computer system requires numerous hardware components and significant user sophistication. This complexity creates a barrier to entry that prevents many individuals from participating in the information age.

Recent developments have sought to address the problem noted above. Companies now provide a service that allows an individual to purchase a relatively inexpensive "set-top box," which is connected to a television receiver to access the Internet. As a result, individuals now have somewhat easier access to the Internet and a simpler way of sending and receiving email.

A representative example of such a set-top system is shown in FIG. 2, and is commercially available from WebTV. Such a system consists of a set-top box 220 which is connected to a conventional television receiver 200. Also attached to television receiver 200 may be a video signal source 210 such as, for example, a VCR or a camcorder.

A user of such a system may compose a email message by using remote control 230 in conjunction with set-top box 220. This may be accomplished by using a wireless keyboard (not shown). Alternatively, set-top box 220 may generate a display of the alphabet, which is shown on television receiver 200. By employing remote control 230, the user selects individual letters of the displayed alphabet to compose words, phrases, or sentences. During this composition, the email message being created is stored in a memory of set-top box 220. Once the message has been fully created, it is transmitted from set-top box 220 to a WebTV system 240. This transmission is performed using a conventional modem and dial-up telephone lines. Once the message reaches WebTV system 240, a WebTV mail server 250 forwards the message to the appropriate destination.

Problems remain, however, despite the availability of such set-top systems. Neither set-top systems nor computer systems contains a robust email management system designed with home users in mind. For example, neither system allows a user to create multimedia email messages or greeting cards.

There exists, therefore, a need for a versatile but simple form of electronic communication that is readily accessible to the general public. To provide versatility, the system should accommodate text, audio, video, and a robust email system; it should also employ an open architecture so that individuals may use whatever Internet service provider they prefer. To provide simplicity, the system should be integrated, rather than having multiple components that its user needs to purchase separately and then assemble together; it should also employ familiar hardware that requires simple commands.

The present invention helps to satisfy this need and solve the problem of providing a simple but versatile form of electronic communication. It provides methods and apparatus that allow its users to manipulate, send, and receive audio/visual information easily by using familiar devices such as an interactive receiver and a remote control device. In particular, the present invention is directed to methods and apparatus for creating multimedia electronic mail messages or greeting cards on an interactive receiver.

SUMMARY OF THE INVENTION

Consistent with this invention, a method for creating and editing multimedia greeting cards and multimedia electronic mail simply, using an interactive television receiver comprises the steps of receiving a command from a user selecting a design template from a list, retrieving a file corresponding to the selected template from a memory within the television receiver, displaying an image corresponding to the file on a screen of the television receiver, receiving a command from a user selecting multimedia data from a list, retrieving the multimedia data from a memory within the television receiver, and mapping the multimedia data to the template in response to commands from the user.

Although this method is described here as one example, one of skill in the art will recognize that there exist other methods and apparatus that are consistent with the claimed invention.

BRIEF DESCRIPTION OF THE DRAWINGS

The accompanying drawings, which are incorporated in and constitute a part of this specification, illustrate the invention and, together with the description, serve to explain the principles of the invention.

DESCRIPTION OF THE PREFERRED EMBODIMENTS

Reference will now be made in detail to an implementation of the present invention as illustrated in the accompanying drawings. Wherever possible, the same reference numbers will be used throughout the drawings and the following description to refer to the same or like parts.

A. Overview

Systems consistent with the claimed invention overcome the limitations associated with conventional systems and provide a simple yet versatile way to compose, edit and transmit multimedia greeting cards or multimedia email messages. A user composes a multimedia greeting card or multimedia email message by selecting a design template, which has previously been created and stored on the system. The design template contains one or more slots, into which the user simply drags and drops any desired text, video, or audio data. The user may also edit and add enhancements to the multimedia greeting card or email message. If desired, the user may electronically mail the resulting product to another user.

As used herein, the term "multimedia data" refers to text, audio, video, or any combination thereof. The term "multimedia item" refers to a multimedia greeting card, a multimedia email message, or a combination thereof.

B. System Diagrams

Figure 1:
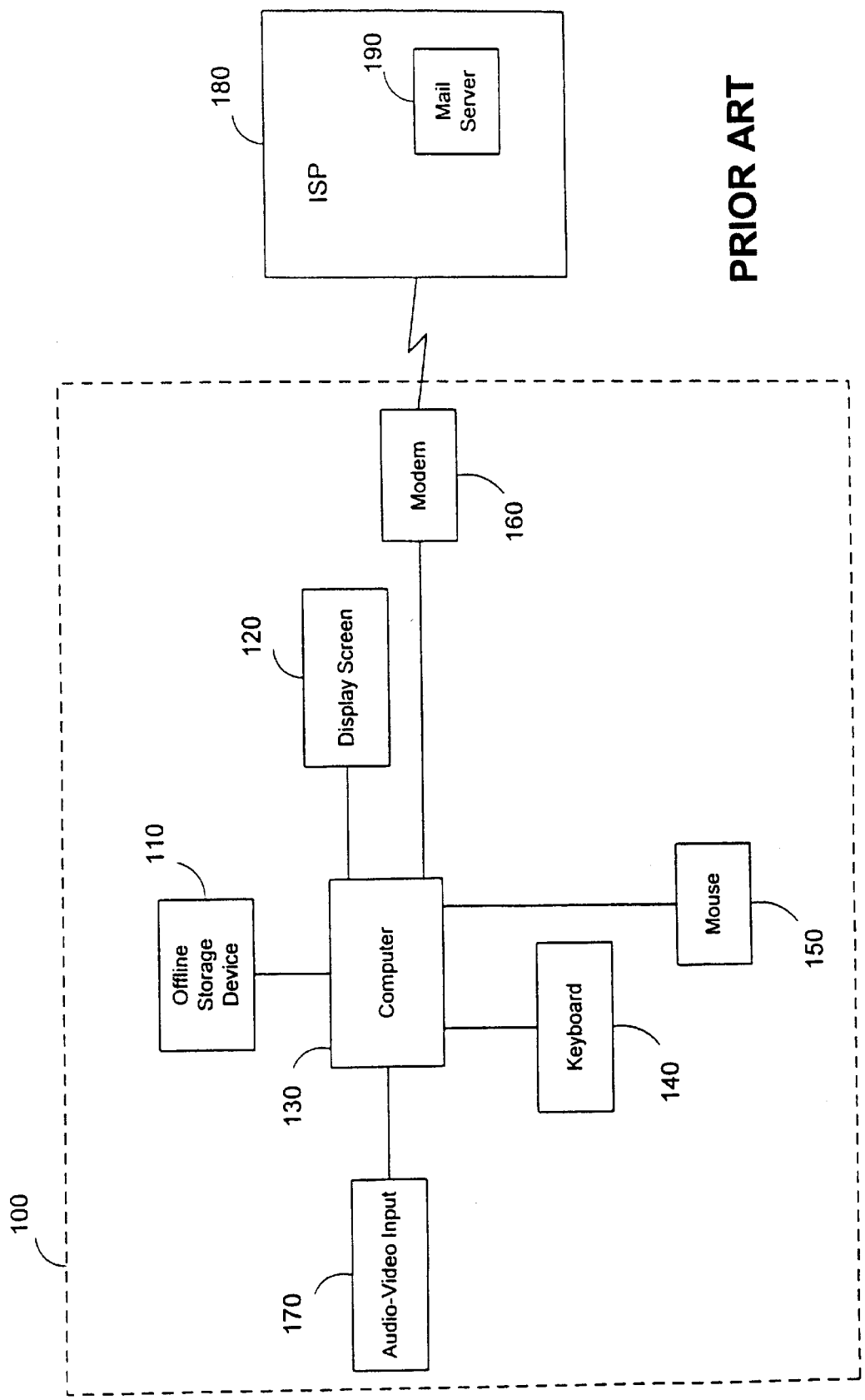
FIG. 1 is a block diagram of a conventional computer system for electronic communication.
Figure 2:
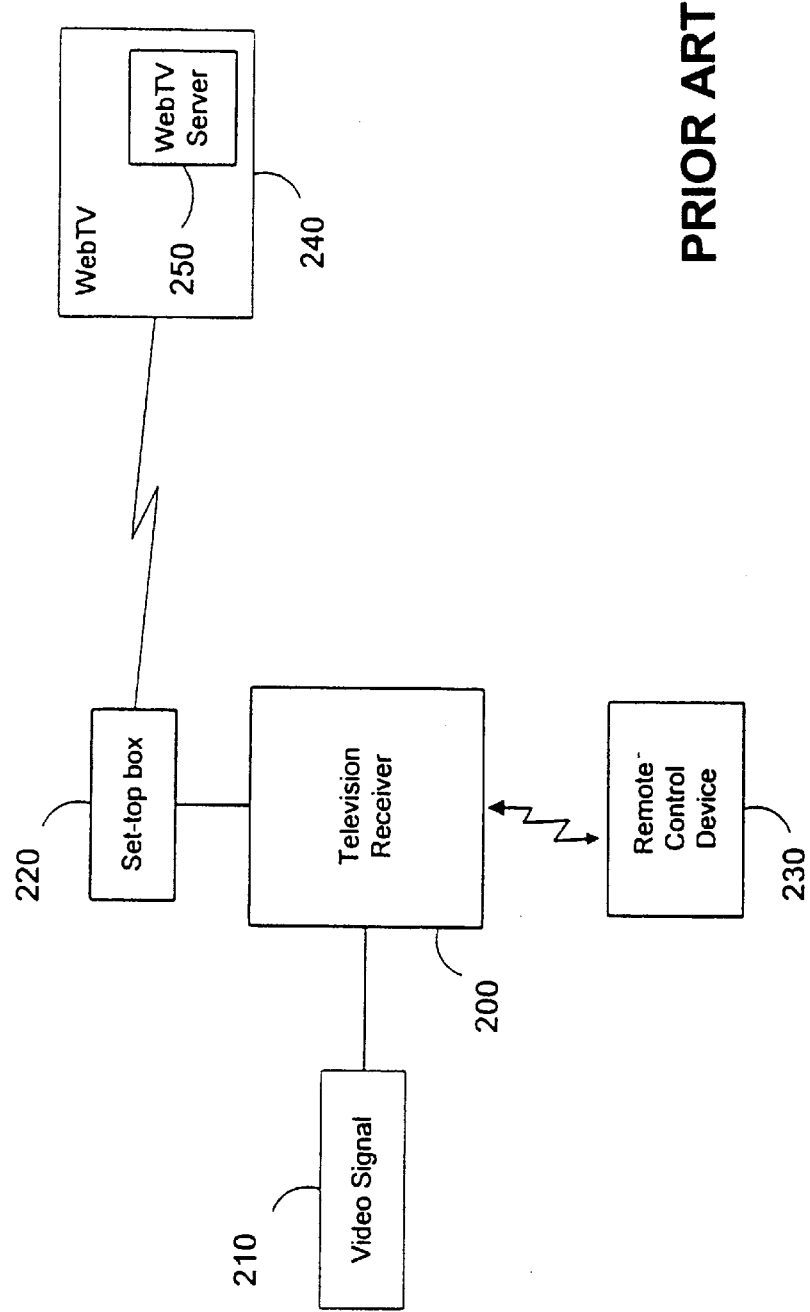
FIG. 2 is a block diagram of a conventional set-top system for electronic communication.
Figure 3:
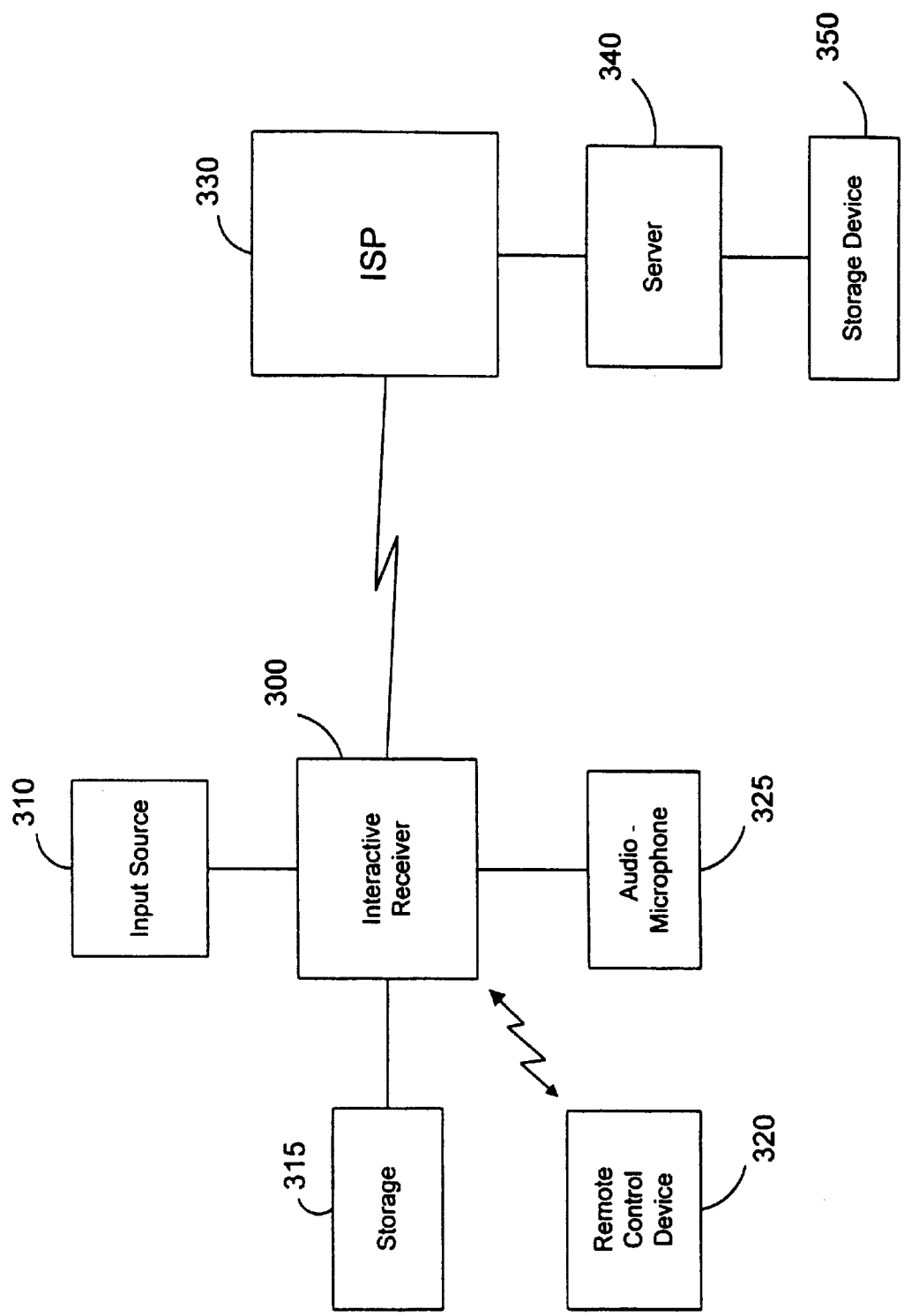
FIG. 3 is a block diagram of a system, consistent with the claimed invention, for creating multimedia email messages or greeting cards.

One example of such a system is shown in FIG. 3. This system consists of an interactive receiver 300 and ISP 330, each of which has other components interfaced to it. Interactive receiver 300 may be similar to a conventional television receiver, with additional features as described below. Connected to interactive receiver 300 are an input source 310, a storage 315, a remote control device 320, and an audio microphone 325. Examples of input source 310 include, but are not limited to, a VCR, a digital still camera, or a camcorder. Examples of storage device 315 include, but are not limited to, a hard disk drive, a digital video drive, an analog tape drive, or a random access memory. Examples of remote control device 320 include, but are not limited to, a television remote control device, or a conventional QWERTY keyboard.

The system also contains a server 340 that is connected to ISP 330. Attached to server 340 is a storage device 350, examples of which include a hard disk, an analog tape drive, or a random access memory. Server 340 is a conventional network mail server computer but contains the software and hardware necessary to manage a system consistent with the claimed invention. This includes, for example, software for the user interface, and temporary or long-term storage for user data.

The system shown in FIG. 3 provides a simple interface allowing users to manage incoming email messages. Moreover, as the system shown in FIG. 3 also demonstrates, a user of such a system is not limited to a specific ISP, as is the case with conventional systems. Any ISP that chooses to use proprietary server 340 may provide its users with this system's capabilities. This open architecture approach provides significant flexibility to users, who may select any ISP of their liking, so long as that ISP supports this system.

Although FIG. 3 shows one example of a system that allows users to manage incoming email messages, those of skill in the art will recognize that there exist other systems that are also consistent with the claimed invention. For example, although FIG. 3 shows server 340 and storage device 350 as being separate from ISP 330, any number of these components may be combined.

Figure 4:
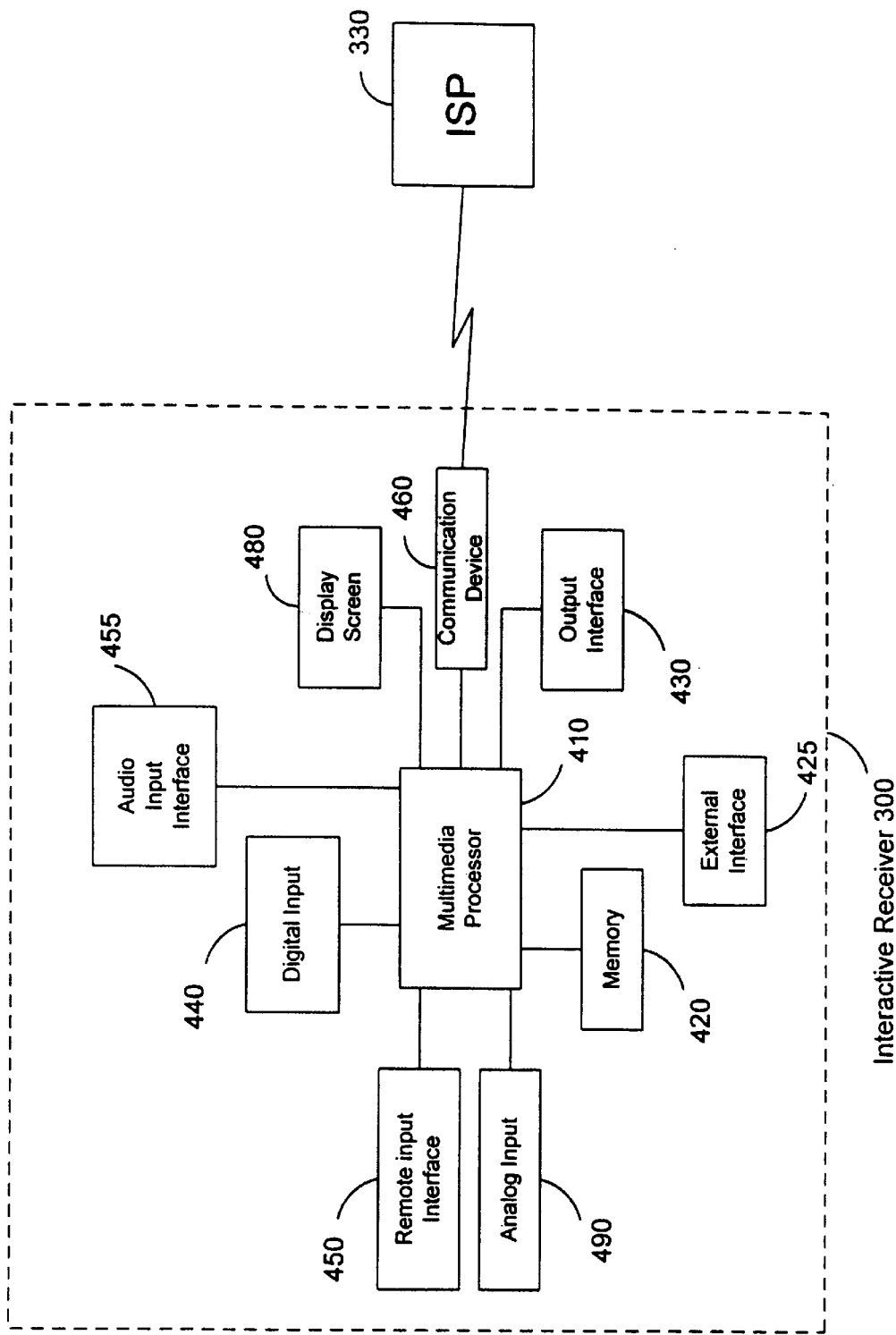
FIG. 4 is a block diagram, consistent with the claimed invention, of an interactive receiver.

FIG. 4 shows a block diagram, consistent with the claimed invention, of the portion of the system with which the administrator and users directly interface, namely, interactive receiver 300. Interactive receiver 300 shown in this diagram contains a multimedia processor 410, examples of which include the Pentium MNX™ processor commercially available from Intel Corporation and the Tri-media™ processor commercially available from Philips Corporation.

Processor 410 provides support for audio-visual information, graphic information, a network stack, and a user interface, and is configured to carry out the steps described below in reference to FIGS. 6–10.

Attached to processor 410 is an analog input 490 and a digital input 440. Input 490 may receive television broadcast information from, for example, a television antenna or a cable television system. Accordingly, input 490 supports standards such as National Television Standards Committee (NTSC). Input 440 may receive information from, for example, digital cable television systems or digital satellite systems. Accordingly, input 440 supports standards such as Quadrature Amplitude Modulation for digital cable and Quadrature Phase Shift Keying for digital satellite systems.

Also attached to processor 410 is an output interface 430 for sending video data from interactive receiver 300 to, for example, a VCR, a digital video drive, or a video printer. In addition to output interface 430, there is attached to processor 410 a display screen 480 for displaying audio-visual and text information to the user. Examples of display screen 480 include a cathode ray tube, a liquid crystal display, or a plasma display.

Also attached to processor 410 is a remote input interface 450 for receiving commands, such as infrared or radio frequency signals, from remote control device 320. In addition, an audio input interface 455 is attached to processor 410, which enables the user to add audio to text or graphic images. Interactive receiver 300 also contains an external interface 425 for communicating with external devices such as offline storage device 315. Examples of external interface 425 include, but are not limited to, the Small Computer System Interface (SCSI), IEEE 1394 ("Firewire"), and Electronics Industry Association Recommended Standard 232. A memory device 420 is attached to processor 410 for storing information. Examples of memory device 420 include, but are not limited to, a hard disk, a random access memory, a flash memory, or a floppy disk.

Also shown in this example is a communication device 460, which represents any device capable of communicating electronic information between multimedia processor 410 and ISP 330. Device 460 may operate over telephone lines using conventional standards such as V.34 or Integrated Services Digital Network (ISDN). Alternatively, device 460 may be a cable modem operating over coaxial cable.

Although FIG. 4 shows one example of an interactive receiver, those of skill in the art will recognize that there exist other devices that are also consistent with the claimed invention. For example, the components shown in FIG. 4 may be integrated into a digital television receiver cabinet. Alternatively, some of the components may be integrated into a television receiver cabinet while others remain externally attached.

Figure 5:
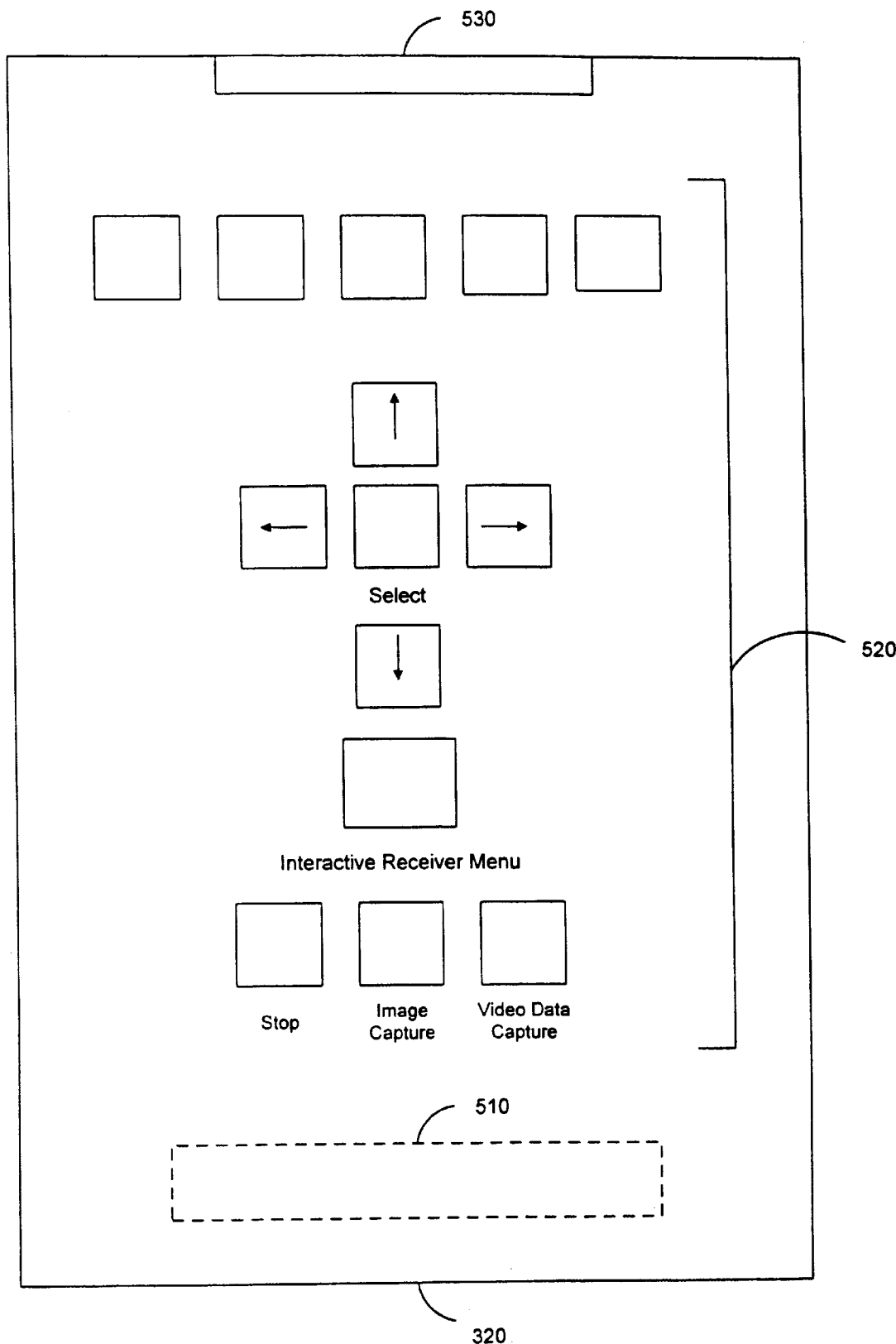
FIG. 5 is a diagram of a remote control device that may be used in conjunction with the claimed invention.

FIG. 5 shows a diagram of a remote control device that may be used in conjunction with the claimed invention. Remote control device 320 is powered by batteries 510 contained within the device. Remote control device 320 also contains numerous user control keys 520. In addition to providing routine television control, such as changing television channels or volume levels, remote control device 320 also contains keys for displaying a menu, cursor control keys for selecting menu items, and keys for initiating and ending the capture of video data. These are shown in FIG. 5 as: an "Interactive Receiver Menu" key, which is used to display a menu; arrow and "Select" keys for manipulating menu items; an "Image Capture" key for initiating a graphic image capture; a "Video Data Capture" key for initiating a video sequence capture; and a "Stop" key for ending the capture of video data. Remote control device 320 also contains an infrared transmitter 530 for conveying commands from remote control device 320 to interactive receiver 300. The channel of communication between remote control device 320 and interactive receiver 300 is not critical. In addition to infrared signals, one may use any other conventional technique such as RF signals or a physical cable.

Although FIG. 5 shows one example of a remote control device, those of skill in the art will recognize that there exist other remote control devices that are also consistent with the claimed invention. For example, remote control device 320 could be a conventional QWERTY keyboard.

A user of a system consistent with the claimed invention purchases an interactive receiver, such as interactive receiver 300. Interactive receiver 300 supports one master account for each home, the master account having multiple user sub-accounts. A user connects interactive receiver 300 to an alternating current power source, and connects modem 460 to a standard telephone line. Upon power-on, the user will be queried by interactive receiver 300 to provide a name and password for an administrator of the account, such as a parent. Once this information is provided, the administrator may configure the system as described below.

C. Flow Diagrams

Figure 6:
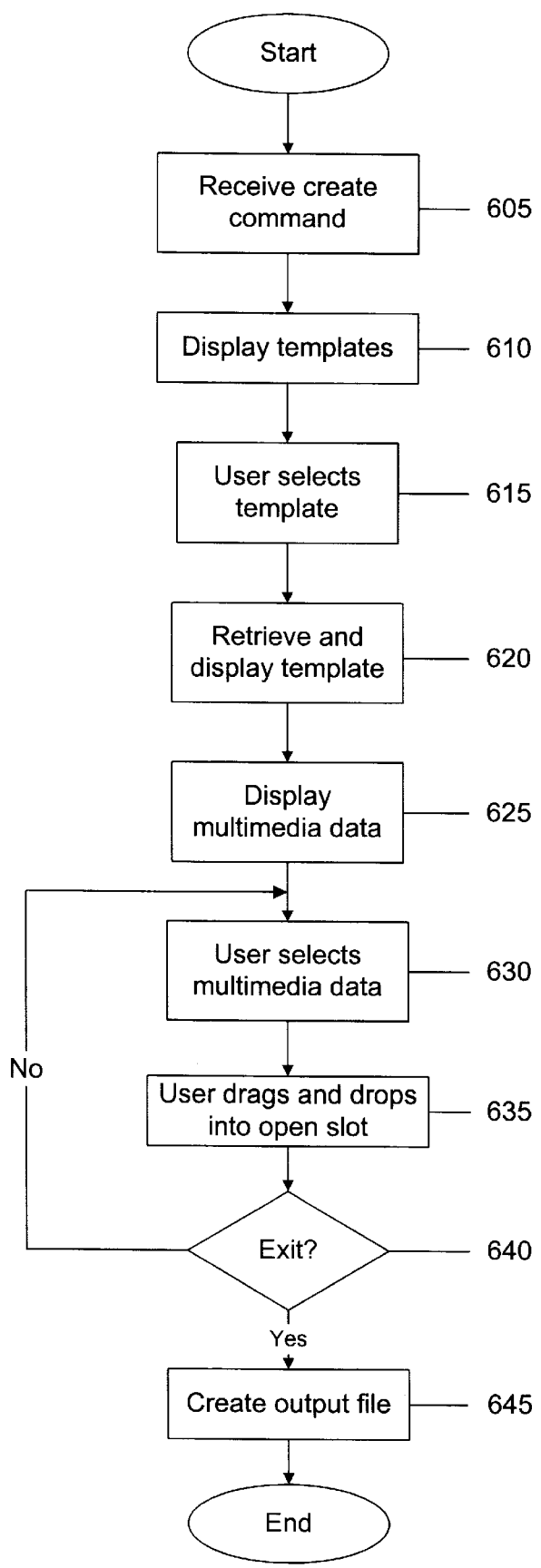
FIG. 6 is a flow diagram of the steps performed to create a multimedia greeting card or multimedia electronic mail message.

FIG. 6 is a logic flow diagram, consistent with the claimed invention, of the steps performed to create a multimedia item. Interactive receiver 300 receives a command via its remote input 450 to create a multimedia item (step 605). This command may be generated, for example, by using a menu system. The user first presses the "Interactive Receiver Menu" key located on remote control device 320. This causes interactive receiver 300 to display on screen 480 a series of menu choices, one of which is for creating a multimedia item. The user then presses the cursor control keys and the "Select" key on remote control device 320 to select the menu choice for creating a multimedia item.

In response, interactive receiver 300 displays on display screen 480 a list of available templates for creating the multimedia item (step 610). This list may be stored in memory device 420, on storage device 315, on storage device 350, or any combination thereof. The user next selects one of the available design templates (step 615), using the cursor control keys on remote control device 320. In response to the user's selection, interactive receiver 300 retrieves and displays the selected design template on display screen 480 (step 620). The design template may be retrieved either from memory device 420, storage device 315, storage device 350, or any combination thereof.

Next, interactive receiver 300 displays a list of available multimedia data on display screen 480 (step 625). The user selects multimedia data, preferably by using the cursor control keys on remote control device 320 (step 630). The user then drags and drops the selected multimedia data onto an open slot on the design template (step 635).

Interactive receiver 300 then checks to determine whether the user has finished adding multimedia data to the design template and wants to exit (step 640). If the user does not want to exit, the user may add additional multimedia data to the template (step 630). On the other hand, the user may choose to exit; if so, the processor creates an output file by mapping the selected multimedia data onto the appropriate portions of the design template (step 645).

The process described above allows its user to generate, in a simple manner, a relatively complex multimedia item. The user simply selects multimedia data and drags it onto an open slot on the design template. The processor performs any necessary mapping functions, such as shrinking multimedia data to fit in an available open slot of the design template. By using such a process, therefore, relatively unsophisticated users can generate multimedia items.

Those skilled in the art will recognize that there exist other processes consistent with the invention. For example, rather than dragging and dropping multimedia data onto slots of a template, a user may simply select multimedia data and a slot onto which that multimedia data is to be mapped.

Figure 7:
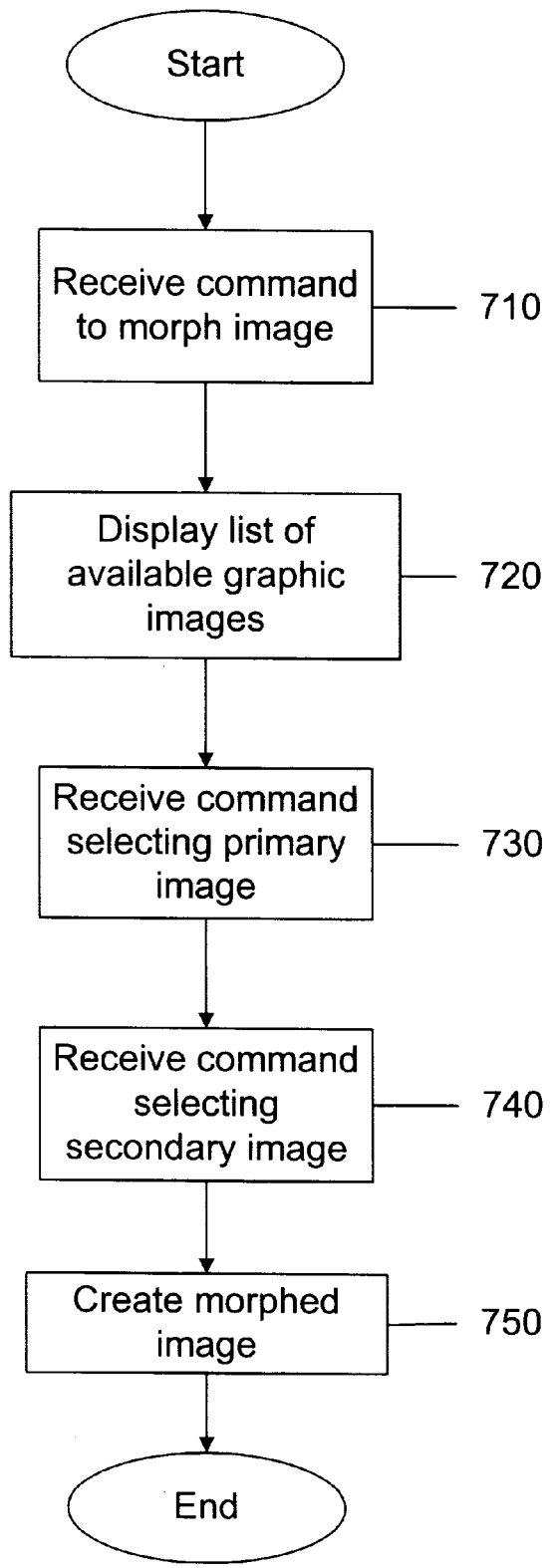
FIG. 7 is a flow diagrams of the steps performed to morph the multimedia data.

FIG. 7 is a logic flow diagram, consistent with the claimed invention, of steps performed to morph a graphic image. Interactive receiver receives a command via remote input 450 to morph a graphic image (step 710). This command may be generated, for example, by using the menu system described above in reference to FIG. 6. In response, interactive receiver 300 displays a list of available graphic images (step 720). Interactive receiver 300 receives a command from the user selecting one of the listed graphic images as the image to be morphed, i.e., the primary image (step 730). Interactive receiver 300 receives another command from the user selecting one of the listed graphic images with which to morph the primary image, i.e., the secondary image (step 740). Interactive receiver 300 then establishes data points on both images and combines the primary image with the secondary image to create a morphed image (step 750).

Figure 8:
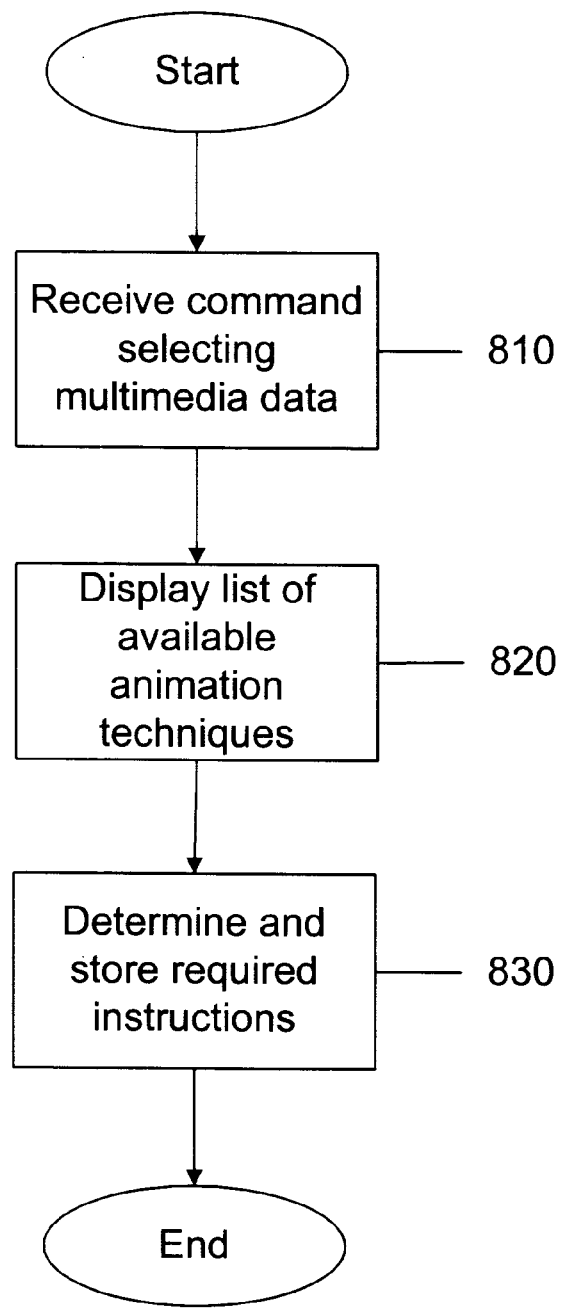
FIG. 8 is a flow diagram of the steps performed to animate the multimedia data.

FIG. 8 is a logic flow diagram, consistent with the claimed invention, of the steps performed to animate multimedia data Interactive receiver 300 receives a user command through remote input 450 selecting multimedia data that was previously inserted into a slot of the design template (step 810). Presuming that the multimedia item is shown on display screen 480, the user may select this multimedia data by using the cursor control keys in combination with the "Select" key on remote control device 320.

In response, interactive receiver 300 presents a list of available animation techniques (step 820). This may include, for example, moving the multimedia data across display screen 480, zooming in on the multimedia data, or zooming out from the multimedia data. Interactive receiver 300 then determines the instructions required to animate the selected multimedia data and stores the instructions as part of the multimedia item file (step 830).

Figure 9:
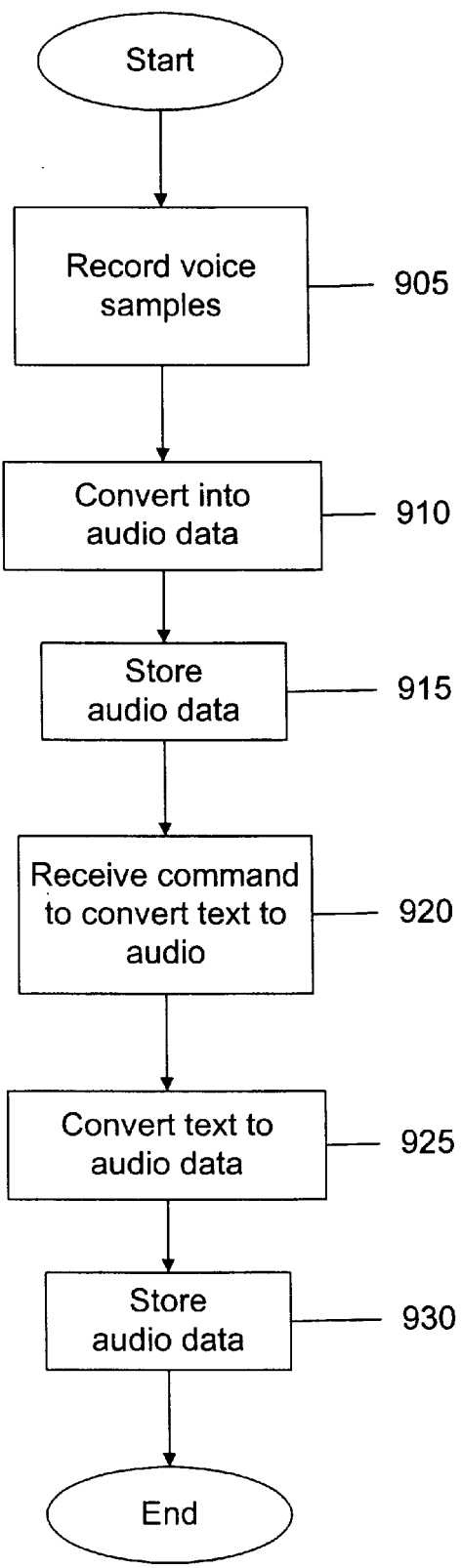
FIG. 9 is a flow diagram of the steps performed to play back the text of a multimedia greeting card or multimedia electronic mail message via audio.

FIG. 9 is a logic flow diagram, consistent with the claimed invention, of the steps performed to play back the text of a multimedia item via audio. The process begins when the user employs remote control device 320 in conjunction with the menu system to record a voice sample. Interactive receiver 300 records samples of the user's voice via audio input interface 455 (step 905). The user may provide the audio samples to audio input interface 455 via audio microphone 325. Interactive receiver 300 converts the audio signals into audio data, by using any conventional standard such as pulse code modulation (PCM) (step 910). Interactive receiver 300 stores the audio data for later use (step 915). This audio data may be stored, for example, in memory 420, on storage device 315, on storage device 360, or any combination thereof.

At some later time, a user issues a command to convert the text portion of a multimedia item into audio (step 920). This command may be issued by the user composing the multimedia item, before the multimedia item is transmitted to another user. Alternatively, the command may be issued by the recipient of the multimedia item.

If the command is issued by the user who composes the multimedia item, the conversion of text to audio may be accomplished either at interactive receiver 300, at server 340, or any combination thereof. If the command is issued by the user who is to receive the multimedia item, the conversion is preferably accomplished at server 340. In either case, the conversion of the text to audio is performed based on the previously stored samples of the composing user's voice (step 925). Interactive receiver 300 preferably stores the resulting audio data in the multimedia item file (step 930).

Figure 10:
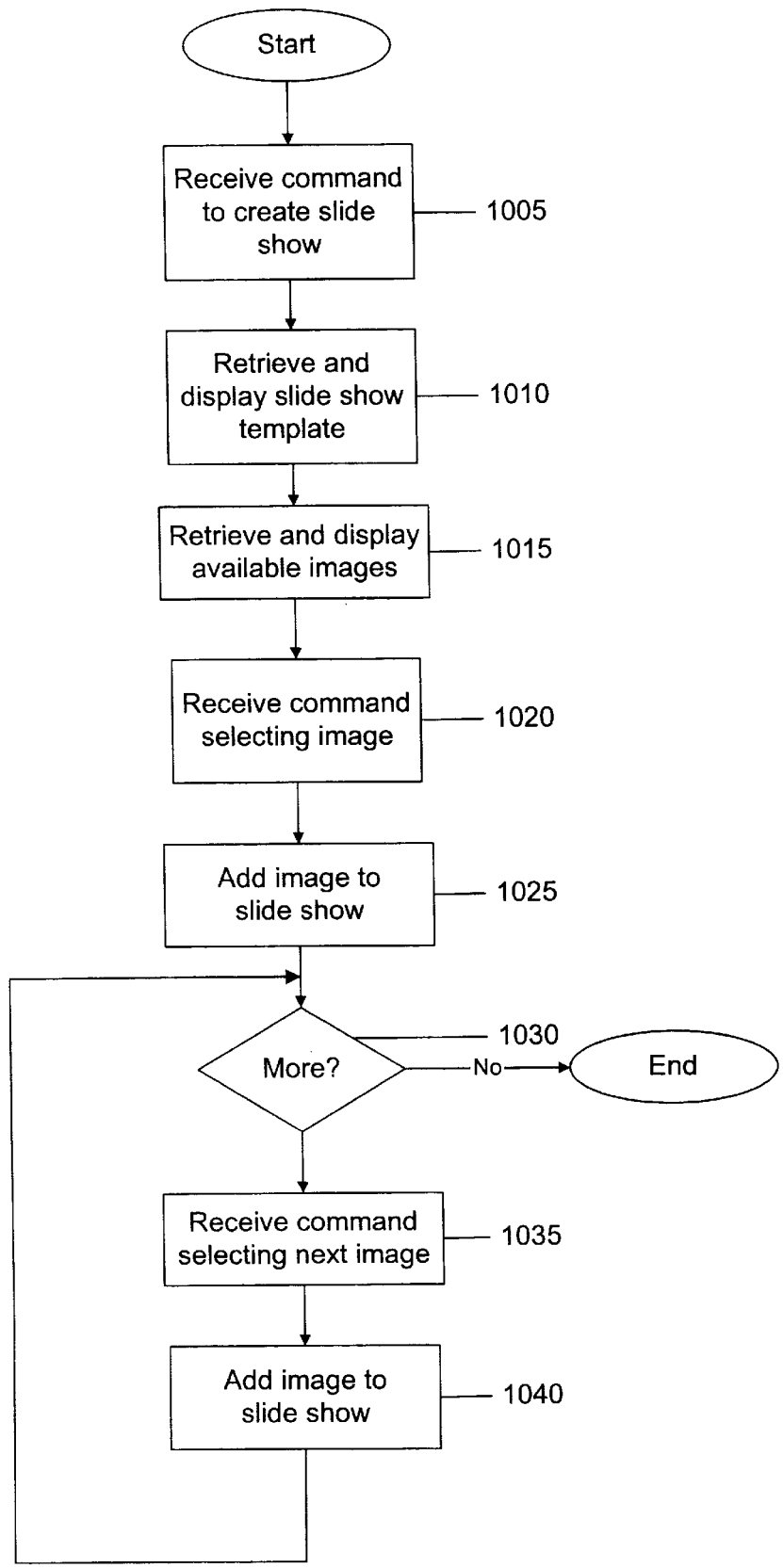
FIG. 10 is a flow diagram of the steps performed to create a slide show of concatenated images.

FIG. 10 is a logic flow diagram, consistent with the claimed invention, of the steps performed to create a slide show of concatenated images. The process begins when interactive receiver 300 receives a command from the user to create a slide show (step 1005). This command may be generated by using remote control device 320 in conjunction with the menu system described above in reference to FIG. 6.

Interactive receiver 300 then retrieves and displays a design template corresponding to a slide show (step 1010). In particular, the design template may be retrieved from memory 420, storage device 315, storage device 350, or any combination thereof, and is displayed on display screen 480.

Next, interactive receiver 300 retrieves and displays on display screen 480 a list of available graphic images (step 1015). This list may be retrieved, for example, from memory 420, storage device 315, storage device 350, or any combination thereof Interactive receiver 300 then receives a command from the user through remote input 450, selecting a first image to be added to the slide show (step 1020). The user may select such an image by using the cursor control keys in conjunction with the "Select" key on the remote control device 320. Interactive receiver 300 then adds the selected image to a slide show file (step 1025).

Next, interactive receiver 300 queries the user as to whether or not the user would like to add more images to the slide show (step 1030). This may be done, for example, by presenting the user with a dialog box, or by displaying an exit button somewhere on display screen 480. If the user selects not to add any more images to the slide show, the process ends. On the other hand, if the user decides to add more images, interactive receiver 300 receives a command from the user through remote input 450 selecting the next image to be added to the slide show (step 1035). This selected image is appended to the slide show file (step 1040), and the process returns to check whether the user wants to add more images (step 1030).

D. Conclusion

Methods and apparatus consistent with the invention provide a simple yet versatile way to compose, edit and transmit multimedia greeting cards or multimedia email messages. Methods and apparatus consistent with the present invention may be implemented in software, hardware, or a combination of hardware and software. Software implementations of the invention are preferably embodied in a computer-readable media, such as a magnetic disk, or transferred over computer-readable media, such as the Internet. It will be apparent to those skilled in the art that various modifications and variations can be made in the methods and systems consistent with the present invention without departing from the spirit or scope of the invention.

What is claimed is:

1. A method for processing multimedia information using an interactive television receiver in a home, the method comprising:

receiving a command from a user selecting a design template;

retrieving a file corresponding to the selected template from a memory of an interactive television receiver configured for receiving a broadcast television signal, the interactive television receiver having one master account for each home and at least one user sub-account;

displaying an image corresponding to the file on a screen of the interactive television receiver;

receiving a command from a user selecting multimedia data;

retrieving the multimedia data from a memory of the interactive receiver; and using the interactive television receiver to map the multimedia data to the template in response to at least one command from the user.

2. The method of claim 1, wherein the mapping step further comprises the steps of:

receiving a command from a user that selects multimedia data;

receiving a command from a user that selects a slot on the template; and associating the multimedia data with the slot on the template.

3. The method of claim 1, wherein the mapping step further comprises the steps of:

receiving a command from a user to drag an image corresponding to the multimedia data onto an image corresponding to the template;

moving the multimedia data image on a screen of the interactive receiver;

receiving a command from a user to drop the multimedia data image into an open slot on the template; and associating the multimedia data with the slot on the template.

4. The method of claim 1, further comprising the step of receiving a command from the user to morph the multimedia data.

5. The method of claim 1, further comprising the step of resizing an open slot on the design template.

6. The method of claim 1, further comprising the step of animating the multimedia data.

7. A computer-readable medium containing instructions for processing multimedia information using an interactive television receiver in a home, by:

receiving a command from a user selecting a design template;

retrieving a file corresponding to the selected template from a memory of an interactive television receiver configured for receiving a broadcast television signal, the interactive television receiver having one master account for each home and at least one user sub-account;

displaying an image corresponding to the file on a screen of the interactive receiver;

receiving a command from a user selecting multimedia data;

retrieving the multimedia data from a memory of the interactive receiver; and using the interactive receiver to map the multimedia data to the template in response to at least one command from the user.

8. The computer-readable medium of claim 7, wherein the mapping step further comprises the steps of:

receiving a command from a user that selects multimedia data;

receiving a command from a user that selects a slot on the template; and associating the multimedia data with the slot on the template.

9. The computer-readable medium of claim 7, wherein the mapping step further comprises the steps of:

receiving a command from a user to drag an image corresponding to the multimedia data onto an image corresponding to the template;

moving the multimedia data image on a screen of the interactive receiver;

receiving a command from a user to drop the multimedia data image into an open slot on the template; and associating the multimedia data with the slot on the template.

10. The computer-readable medium of claim 7, further comprising the step of receiving a command from the user to morph the multimedia data.

11. The computer-readable medium of claim 7, further comprising the step of resizing an open slot on the design template.

12. The computer-readable medium of claim 7, further comprising the step of animating the multimedia data.

13. An interactive television receiver for processing multimedia information, comprising:

means for receiving a command from a user selecting a design template;

means for retrieving a file corresponding to the selected template from a memory of an interactive television receiver configured for receiving a broadcast television signal, the interactive television receiver having one master account for each home and at least one user sub-account;

means for displaying an image corresponding to the file on a screen of the interactive receiver;

means for receiving a command from a user selecting multimedia data;

means for retrieving the multimedia data from a memory of the interactive receiver;

means for mapping the multimedia data to the template using the interactive receiver in response to at least one command from the user;

means for generating a multimedia electronic greeting card based on the mapped multimedia data; and means for transmitting the generated multimedia greeting card via an arbitrary internet service provider having a proprietary server that is compatible with the interactive television receiver.

14. An apparatus for processing multimedia information, comprising:

a radio frequency circuit for receiving a standard television broadcast signal;

a screen for displaying video information from the broadcast signal;

a memory having program instructions, the memory associated with an interactive television receiver having one master account for each home and at least one user sub-account; and a processor configured to use the program instructions to perform the steps of:

receiving a command from a user selecting a design template;

retrieving a file corresponding to the selected template from the memory;

displaying an image corresponding to the file on the screen;

receiving a command from a user selecting multimedia data;

retrieving the multimedia data from the memory; and using the interactive television receiver to map the multimedia data to the template in response to at least one command from the user.

15. The apparatus of claim 14, wherein the radio frequency circuit and the screen are contained within a single enclosure.

16. The apparatus of claim 15, wherein the memory is contained within the single enclosure.

17. The apparatus of claim 16, wherein the processor is contained within the single enclosure.

18. The apparatus of claim 14, wherein the mapping step further comprises the steps of:

receiving a command from a user that selects multimedia data;

receiving a command from a user that selects a slot on the template; and associating the multimedia data with the slot on the template.

19. The apparatus of claim 14, wherein the mapping step further comprises the steps of:

receiving a command from a user to drag an image corresponding to the multimedia data onto an image corresponding to the template;

moving the multimedia data image on a screen of the interactive receiver;

receiving a command from a user to drop the multimedia data image into an open slot on the template; and associating the multimedia data with the slot on the template.

20. The apparatus of claim 14, further comprising the step of receiving a command from the user to morph the multimedia data.

21. The apparatus of claim 14, further comprising the step of resizing an open slot on the design template.

22. The apparatus of claim 14, further comprising the step of animating the multimedia data.

* * * * *